(12) United States Patent
Kearney et al.

(10) Patent No.: US 8,800,753 B2
(45) Date of Patent: Aug. 12, 2014

(54) SYSTEM FOR CONVEYING AN ARTICLE USING VORTEX SUCTION UNITS

(75) Inventors: Peter Xavier Kearney, Fridingen (DE); Andreas Wardak, Rottweil (DE)

(73) Assignee: BDT Media Automation GmbH, Rottweil (DE)

( * ) Notice: Subject to any disclaimer, the term of this patent is extended or adjusted under 35 U.S.C. 154(b) by 812 days.

(21) Appl. No.: 12/717,505

(22) Filed: Mar. 4, 2010

(65) Prior Publication Data

US 2011/0056804 A1 Mar. 10, 2011

Related U.S. Application Data

(63) Continuation of application No. 12/556,734, filed on Sep. 10, 2009, now abandoned.

(51) Int. Cl.
*B65G 47/00* (2006.01)
(52) U.S. Cl.
USPC ......... 198/617; 198/689.1; 198/811; 271/197
(58) Field of Classification Search
USPC ................... 198/689.1, 811, 617; 406/77, 78; 271/3.23, 195, 197
See application file for complete search history.

(56) References Cited

U.S. PATENT DOCUMENTS

| | | | | |
|---|---|---|---|---|
| 3,620,526 A | * | 11/1971 | Iles et al. | 271/96 |
| 3,847,383 A | | 11/1974 | Wojtowicz et al. | |
| 3,902,647 A | * | 9/1975 | Neumann et al. | 226/97.3 |
| 4,148,476 A | * | 4/1979 | Brekell | 271/194 |
| 4,193,469 A | | 3/1980 | Graf | |
| 4,270,879 A | * | 6/1981 | Kacirek | 414/788.9 |
| 4,368,973 A | | 1/1983 | Silverberg | |
| 4,643,413 A | | 2/1987 | Ward et al. | |
| 4,822,022 A | | 4/1989 | Attenasio | |
| 4,998,715 A | * | 3/1991 | Milan et al. | 271/297 |
| 5,046,272 A | * | 9/1991 | Vogt et al. | 38/143 |
| 5,090,676 A | | 2/1992 | Matsuno et al. | |
| 5,110,110 A | | 5/1992 | Wirz et al. | |
| 5,232,213 A | | 8/1993 | Parsons et al. | |
| 5,425,217 A | * | 6/1995 | Lobash et al. | 53/435 |
| 5,645,274 A | | 7/1997 | Ubayashi et al. | |
| 5,671,920 A | | 9/1997 | Acquaviva et al. | |

(Continued)

FOREIGN PATENT DOCUMENTS

DE 102007022700 A1 11/2008
EP 1975735 A1 10/2008

(Continued)

OTHER PUBLICATIONS

Co-pending U.S. Appl. No. 12/775,522, filed May 7, 2010 entitled "Vortex Suction Separator Device".

(Continued)

*Primary Examiner* — Joseph Dillon, Jr.
(74) *Attorney, Agent, or Firm* — Leydig, Voit & Mayer, Ltd.

(57) ABSTRACT

A system for conveying an article along a transfer path includes at least a first and a second vortex suction unit disposed in sequence in a direction of the transfer path. A conveyor is configured to support the article relative to at least one of the suction units and a main controller is configured to separately control the vortex suction units so as to convey the article along the transfer path using the conveyor.

12 Claims, 12 Drawing Sheets

(56) References Cited

U.S. PATENT DOCUMENTS

| | | | |
|---|---|---|---|
| 5,699,707 A * | 12/1997 | Campbell, Jr. | 83/100 |
| 5,893,554 A | 4/1999 | Okahashi et al. | |
| 5,971,134 A * | 10/1999 | Trefz et al. | 198/460.1 |
| 6,000,528 A * | 12/1999 | van Maanen | 198/461.1 |
| 6,015,144 A | 1/2000 | Yoshii et al. | |
| 6,082,728 A | 7/2000 | Ubayashi | |
| 6,120,016 A | 9/2000 | Watkiss | |
| 6,216,848 B1 * | 4/2001 | Zens | 198/689.1 |
| 6,402,843 B1 | 6/2002 | Siniaguine et al. | |
| 6,419,217 B1 * | 7/2002 | Hartmann et al. | 270/52.12 |
| 6,497,553 B2 | 12/2002 | Illingworth et al. | |
| 6,565,321 B1 | 5/2003 | Illingworth et al. | |
| 6,595,739 B1 * | 7/2003 | LaPlace et al. | 414/793 |
| 6,595,753 B1 | 7/2003 | Illingworth et al. | |
| 6,729,614 B2 | 5/2004 | Okazaki et al. | |
| 6,729,839 B1 | 5/2004 | Illingworth et al. | |
| 6,802,881 B2 | 10/2004 | Illingworth et al. | |
| 6,811,678 B2 | 11/2004 | Strezov et al. | |
| 6,863,172 B2 * | 3/2005 | Spatafora et al. | 198/370.12 |
| 6,941,973 B2 * | 9/2005 | Hehmann | 138/42 |
| 6,960,063 B2 | 11/2005 | Reinfeld et al. | |
| 7,204,672 B2 | 4/2007 | Sewell | |
| 7,240,465 B2 * | 7/2007 | Davi' et al. | 53/58 |
| 7,284,945 B2 * | 10/2007 | Ikehata et al. | 414/676 |
| 7,293,770 B2 * | 11/2007 | Edinger | 271/276 |
| 7,364,150 B2 | 4/2008 | Nakane | |
| 7,380,781 B2 * | 6/2008 | Ikeda | 271/98 |
| 7,384,035 B2 * | 6/2008 | Detloff | 271/194 |
| 7,568,574 B2 * | 8/2009 | Nagatomo | 198/493 |
| 7,731,186 B2 * | 6/2010 | Krause et al. | 271/193 |
| 7,748,697 B2 | 7/2010 | Fujita et al. | |
| 7,841,591 B2 | 11/2010 | Ueda et al. | |
| 7,913,993 B2 | 3/2011 | Kosugi et al. | |
| 7,922,174 B2 * | 4/2011 | Panides et al. | 271/276 |
| 7,958,988 B2 * | 6/2011 | Miyamoto | 198/689.1 |
| 7,987,964 B2 * | 8/2011 | McCabe | 198/471.1 |
| 8,016,115 B2 * | 9/2011 | Fryars | 209/138 |
| 8,083,462 B2 * | 12/2011 | Barge | 414/797.2 |
| 2001/0040062 A1 | 11/2001 | Illingworth | |
| 2002/0155001 A1 * | 10/2002 | Reinfeld et al. | 416/185 |
| 2004/0018089 A1 * | 1/2004 | Illingworth et al. | 416/185 |
| 2004/0089994 A1 | 5/2004 | Koga et al. | |
| 2004/0099504 A1 * | 5/2004 | Spatafora et al. | 198/438 |
| 2005/0133980 A1 | 6/2005 | Koga | |
| 2007/0267274 A1 * | 11/2007 | Steffen et al. | 198/689.1 |
| 2008/0006565 A1 * | 1/2008 | Fryars | 209/718 |
| 2008/0237968 A1 | 10/2008 | Suzuki | |
| 2009/0127768 A1 | 5/2009 | Shima et al. | |
| 2010/0007082 A1 | 1/2010 | Mueller et al. | |
| 2010/0148419 A1 | 6/2010 | Suzuki | |
| 2011/0293346 A1 * | 12/2011 | Sato | 400/578 |

FOREIGN PATENT DOCUMENTS

| | | |
|---|---|---|
| GB | 2295799 A | 7/1996 |
| GB | 2343879 A1 | 5/2000 |
| JP | 62016947 A | 1/1987 |

OTHER PUBLICATIONS

Co-pending U.S. Appl. No. 12/900,029, filed Oct. 7, 2010, entitled "Stack Feeding Aeration Device and Method".

* cited by examiner

SYSTEM FOR CONVEYING AN ARTICLE USING VORTEX SUCTION UNITS

CROSS REFERENCE TO PRIOR APPLICATION

This application is a continuation of U.S. patent application Ser. No. 12/556,734, filed on Sep. 10, 2009, and which is hereby incorporated by reference herein.

FIELD

The present invention relates generally to conveyance systems, and more specifically to a system for conveying an article using vortex suction units.

BACKGROUND

Conveyance systems ordinarily rely on friction drives (i.e., belts or rollers) using gravity as a friction force to maintain an article being conveyed along a transfer path. However, when the article being transported is relatively flat and/or lightweight, ambient air streams can cause the article to get blown off from the conveyor. Additionally, when the conveyor is vertical or inclined, the article is likewise susceptible to sliding, rolling or flying away from the transfer path.

U.S. Pat. No. 5,671,920 describes use of an external low pressure generator for providing an additional force to maintain an article on a conveyor.

U.S. Patent Application Publication No. 2005/0133980 describes use of an axial fan on the opposite side of a belt from paper being conveyed thereon.

U.S. Pat. No. 6,565,321 describes a vortex attractor. An impeller including a plurality of radial blades extending in a direction of the rotation axis are provided to generate a vortex flow. The vortex flow provides a central negative low pressure region which can be used to attract an object or maintain the vortex attractor against or at a distance from a surface.

SUMMARY

In an embodiment, the present invention provides a system for conveying an article along a transfer path including at least a first and a second vortex suction unit disposed in sequence in a direction of the transfer path. A conveyor is configured to support the article relative to at least one of the suction units and a main controller is configured to separately control the vortex suction units so as to convey the article along the transfer path using the conveyor.

BRIEF DESCRIPTION OF THE DRAWINGS

The foregoing and other features of the present invention will be more readily apparent from the following detailed description and drawings of illustrative embodiments of the invention in which.

Like reference numerals are used in the drawing figures to connote like components of the system.

DETAILED DESCRIPTION

Figure 1:
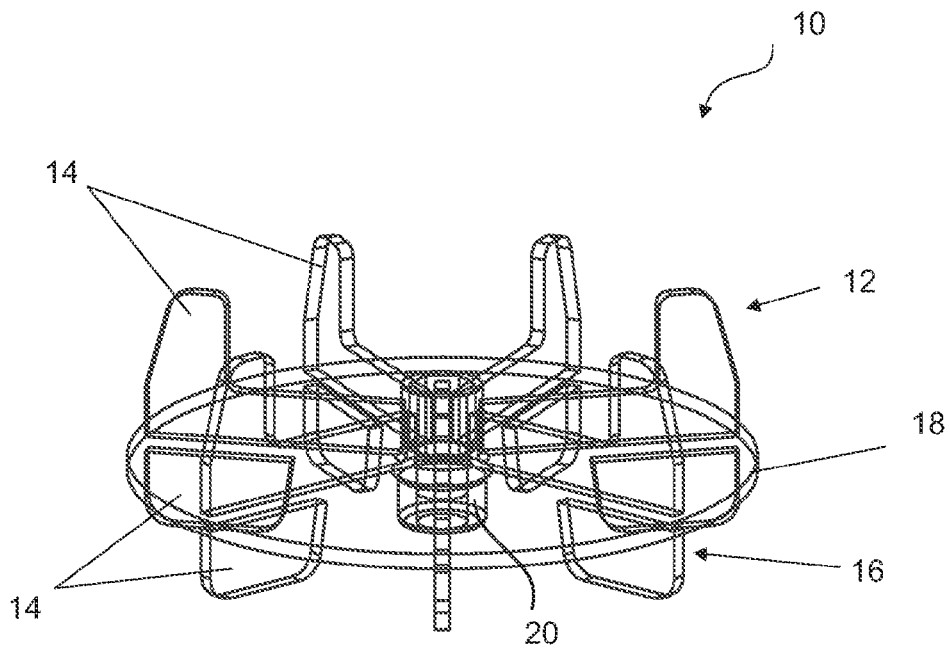
FIG. 1 is a front view of a vortex suction unit in accordance with an embodiment of the present invention.
Figure 2:
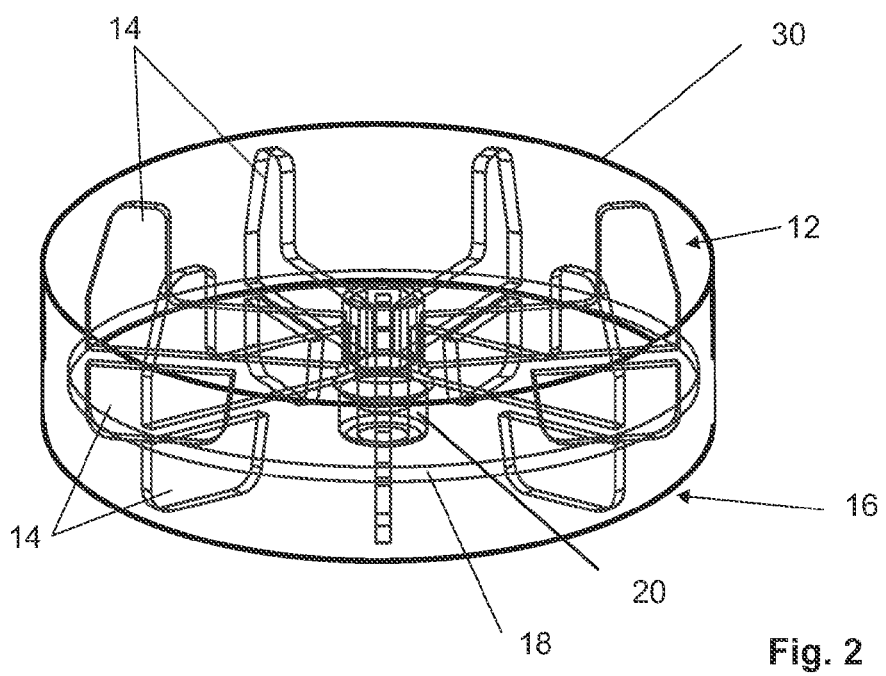
FIG. 2 is a perspective view of the vortex suction unit of FIG. 1.
Figure 3:
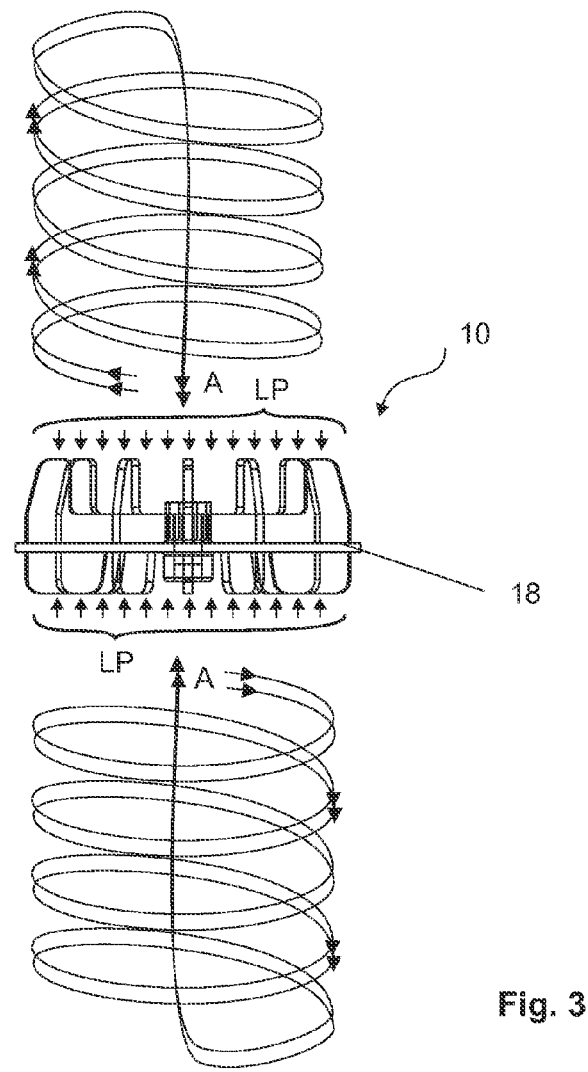
FIG. 3 is a schematic view of the fluid flow generated by the vortex suction unit.
Figure 4:
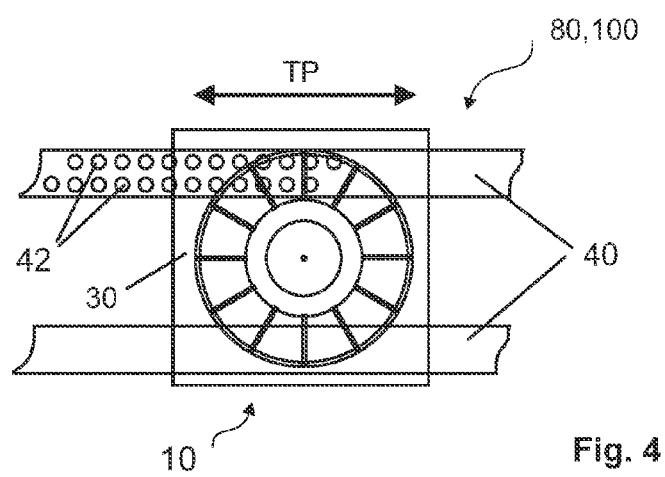
FIG. 4 is a sectional view of the vortex suction unit in a conveyance system.
Figure 5:
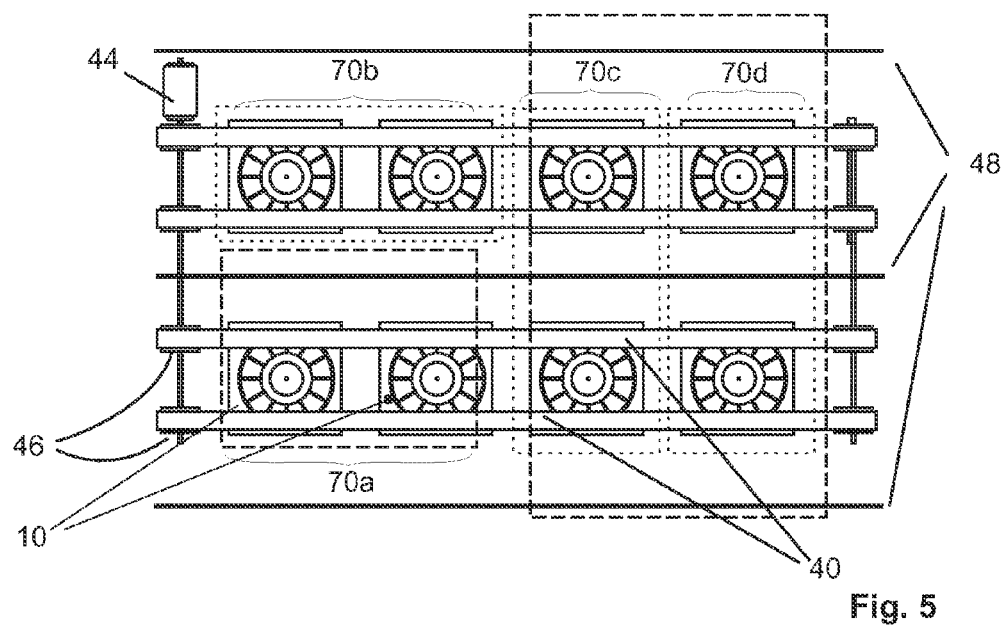
FIG. 5 is a top view of a conveyor using vortex suction units in accordance with an embodiment of the present invention.

Referring to FIGS. 1-3, a vortex suction unit 10 includes an upper vortex generator 12 driven by a motor 20. The upper vortex generator 12 includes a base 18 concentrically driven by the motor 20 and a plurality of blades 14 radially disposed on the base 18 and extending perpendicularly upwards therefrom. In an embodiment, a similar lower vortex generator 16 including blades 14 is provided on the opposite side of the base 18 in order to provide a cooling flow of air to the body of the motor 20. However, in one embodiment, only the upper vortex generator 12 is provided to generate the attraction force A based upon the principles of a tornado. The motor 20 may be an AC or DC motor. For example, the motor 20 is a brushless DC motor or a stepper motor. The blades 14 may be a number of different shapes, such as curved. In an embodiment, the blades 14 are substantially straight and flat. For example, the blades 14 of the upper vortex generator 12 may include a recessed at an upper, inward and radially-extending portion thereof. A housing 30 may be provided on the vortex suction unit 10 surrounding the peripheral edge of the base 18 and blades 14. The housing 30 may be, for example, a shell or a ring. Alternatively, the upper vortex generator 12 and/or the lower vortex generator 16 may be manufactured, for example, by molding, to form a ring surrounding the blades 14.

A vortex suction unit 10 is any device capable of generating a vortical fluid flow FF. By way of example, a vortex attractor as described in U.S. Pat. No. 6,565,321 or in U.S. Pat. No. 7,204,672, which are hereby incorporated by reference herein, may be used. The radially extending blades 14 generate the fluid flow FF helically containing a low pressure region LP within the vortex generator 12 inside the peripheral edges of the blades 14. An attraction force A is generated in the low pressure region LP which allows the vortex suction unit 10 to both attract and move toward (when the vortex suction unit 10 is not fixed) the surface of an object. Vortex suction units 10 are effective to removably adhere to planar and non-planar surfaces or to maintain the same at a predetermined distance. It is also noted that the vortex suction units 10 may be modified to apply a negative attraction force A, or a repulsion force, to push an article 50 away.

Figure 18:
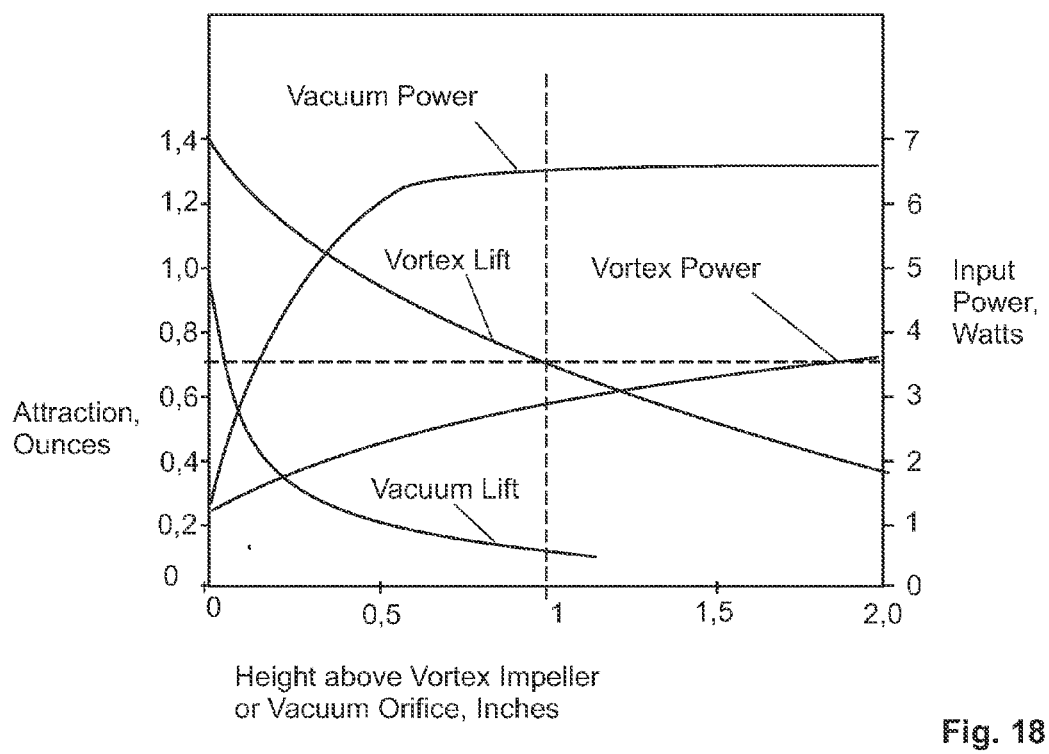
FIG. 18 is a graph comparing attraction force and power consumption of vortex suction units and standard axial fans.
Figure 19:
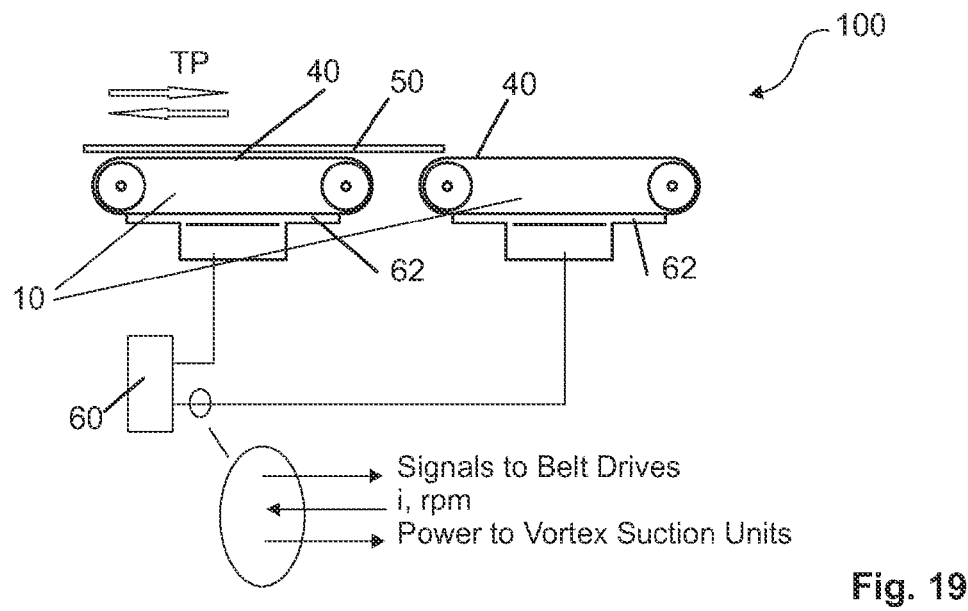
FIG. 19 is a schematic view of a controller for first and second vortex suction units.

In one embodiment, the upper and lower vortex generators 12, 16 are formed from a lightweight material, such as plastic, and have a diameter of approximately 50 mm. In this manner, the rotational inertia is kept low such that the vortex suction module can be started and stopped quickly. Likewise, the speed may be adjusted quickly and easily. The motor 20 is a brushless DC motor which responds quickly to changes in power level to adjust its rotations per minute (rpm). At about 22,000 rpm, the vortex suction unit 10 generates an attraction force A of about 1.3 N throughout the low pressure region LP. Referring to FIG. 18, a comparison is made for illustrative purposes between a vortex impeller and a vacuum suction chamber having a fan configured for low pressure generation (vacuum power). In addition to being responsive to power changes to quickly change speed and thereby increase or decrease its attraction force, the vortex impeller is also far more efficient and effective than the vacuum system when at a distance from an object to be adhered; this is a desirable positioning for proper conveyance to allow room for belts and/or prevent sticking. For example, where the article 50 is disposed at a distance of 1.0 mm from the upper vortex generator 12, an attraction of approximately 0.7 ounces is achieved while consuming only about 3.5 Watts of power. In contrast, at the same distance of 1.0 mm, the fan of the vacuum generator consumes approximately 6.5 Watts of power while providing attraction for only about 0.1 ounces.

Referring to FIGS. 4-6 and 17, vortex suction units 10 are disposed adjacent a transfer path TP, the direction of which is indicated by arrows. An article 50 is moved by a conveyor 80 along the transfer path TP by belts 40 and/or fraction rollers 46. The transfer path TP corresponds to the predetermined conveyance positions of the article 50 as it moves along the conveyor 80. The vortex suction units 10 are arranged in sequence along the transfer path TP and may also be disposed into arrays 70 which may be, for example, vertical arrays 70a, 70b arranged side by side or sequentially arranged horizontal arrays 70c, 70d. It is also possible to provide the vortex suction units 10 in an offset arrangement (see FIG. 17) in order to reduce the total number of vortex suction units 10 necessary for a particular conveyor 80. The vortex suction units 10 may be arranged side by side, and may be arranged with a predetermined spacing which is less than the length of a respective edge of the article 50 such that it is adhered to the belts 40 at all points during conveyance.

Figure 7:
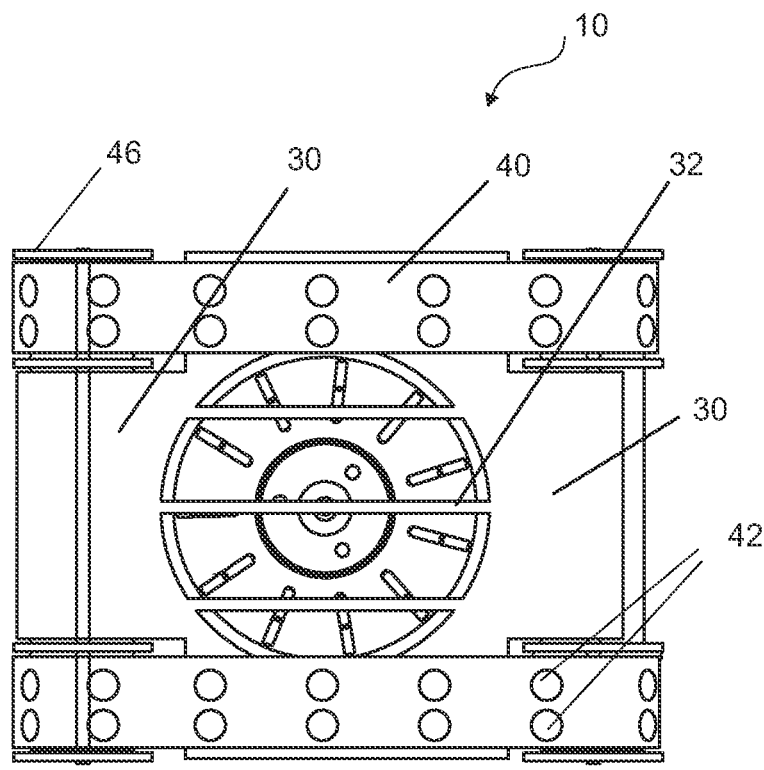
FIG. 7 is a top view of a vortex suction unit having its own means of conveyance.
Figure 8:
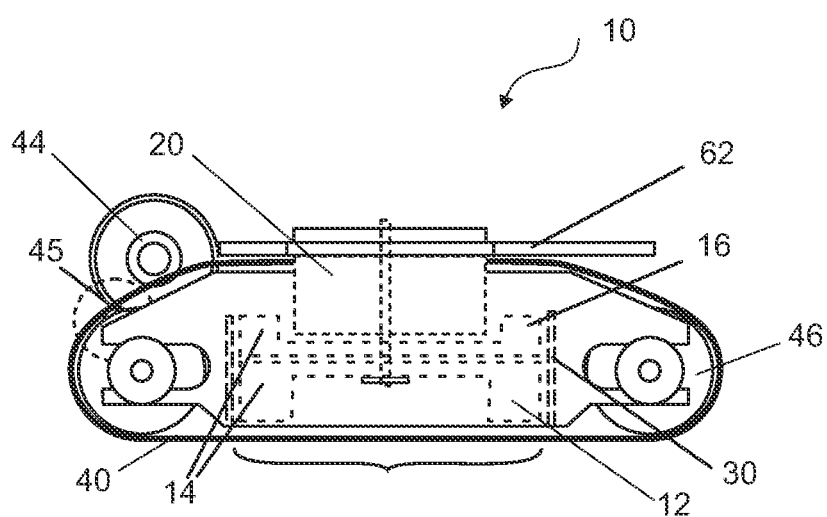
FIG. 8 is a sectional side view of the vortex suction unit of FIG. 7.
Figure 9:
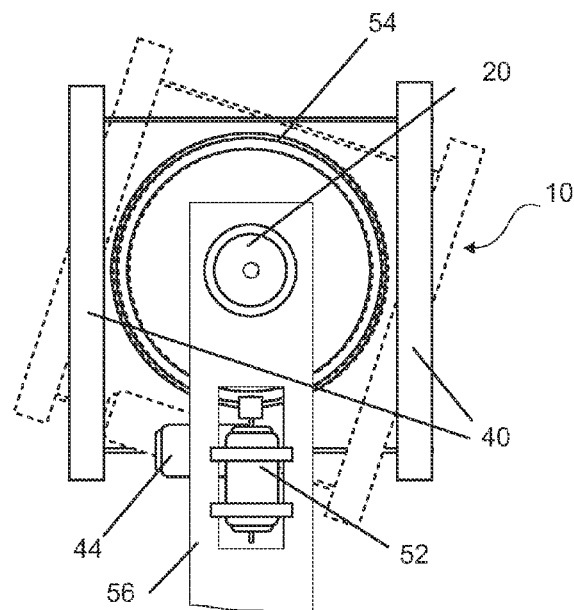
FIG. 9 is a top view of the vortex suction unit of FIG. 7 provided with means for rotating the unit.
Figure 10:
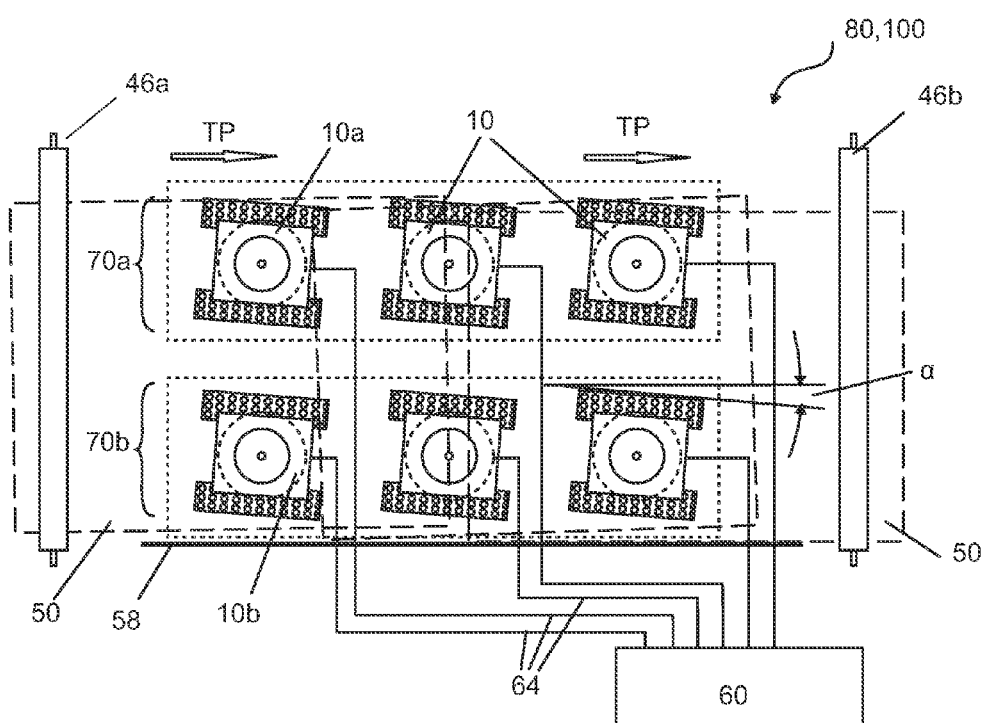
FIG. 10 is a top view of a conveyance system including a plurality of vortex suction units of FIG. 9 and a controller connected thereto.

The housings 30 of the vortex suction units 10 may be square or other shapes and surround the outside edges of the blades 14. A cover 32, which may be a screen, a grid, concentric circles, an air permeable material, a plate with openings or ribs, may be provided on the vortex suction units 10. In an embodiment shown in FIG. 7, the cover 32 includes ribs extending in the direction of the transfer path TP such that an article 50 which is flexible, such as paper, is provided a slight corrugation in the direction of the transfer path TP. The housing 30 may also include idler balls or rollers which contact the article 50 during conveyance to decrease friction.

The cover 32 may be provided to minimize risk of injury, keep objects from interfering with the blades, to maintain a spacing to the article 50 and/or to aid in guiding and supporting the article 50 as it moves along the transfer path TP. In an embodiment, the cover 32 is disposed at a distance from the article 50 such that a flexible article 50 being carried by belts 40 is given a concave or corrugation shape by vortex suction units 10 positioned between pairs of belts 40, thereby imparting a degree of rigidity. Further, covers 32 may extend between vortex suction units 10 so as to provide a smooth, supported transition as the article moves from one vortex suction unit 10 to the next.

The belts 40 may be formed from a material having a significant coefficient of friction and may be toothed, such as in a synchronous type conveyor, textured or profiled. For example, spikes, grooves or ribs may be provided on the surface of the belts 40. Typical elastic or elastomeric belts 40 are sufficient to convert the normal force into a transport force. The surface of belts 40 may be roughened to increase friction in their entirety or only at certain areas to create a surface having regions with different coefficients of friction. Further, the belts 40 may be at least partially air permeable. For example, the belts 40 may be perforated or formed from a nano-material. The belts 40 may be driven by a belt drive 44, which may be adjustable to control the conveyance speed.

The conveyor 80 may include support rails 48 which support and assist in maintaining the position of the article 50 in the transfer path TP. In an embodiment, the vortex suction units 10 are arranged on the opposite side of the belts 40 from the article 50 and are positioned between adjacent pairs of belts 40. However, one air permeable belt 40 may be provided over in lieu of the covers 32. The belts 40 may also contain a plurality of perforations 42 through which the attraction force A adheres the articles 50 to the belts 40, in which case the conveyor 80 includes just one belt 40 or multiple parallel belts 40.

Other types of conveyors 80 are also possible, such as ones using sequentially arranged driven rollers with a spacing therebetween, in which case the vortex suction units 10 are arranged below the spacings and provide the attraction force A to the article 50 therethrough. Likewise, conveyors 80 include other systems of conveyance, such as supports, for example, support rods or rollers, arranged such that the article is conveyed by gravity or an applied force.

Figure 6:
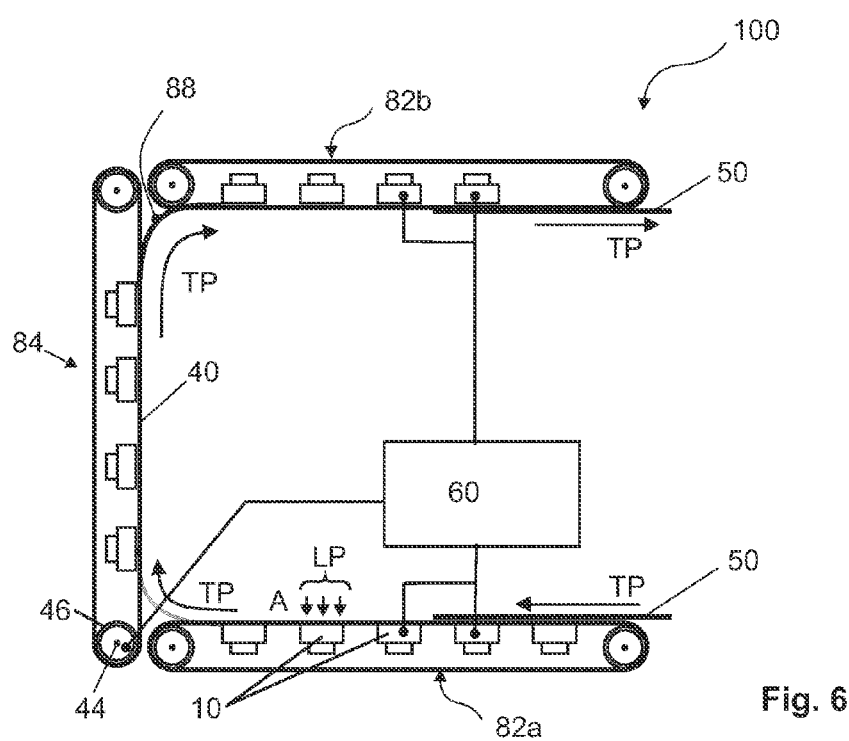
FIG. 6 is a schematic view of a system of conveying an article in accordance with an embodiment of the present invention.

The conveyors 80, may be horizontal conveyors 82, vertical conveyors 84, and may also be inclined, curved, rectangular, circular, or the like. For example, as shown in FIG. 6, an article 50 enters the transfer path TP on top of a first horizontal conveyor 82a, traveling to a vertical conveyor 84 and up to the bottom of a second horizontal conveyor 82b, wherein the attraction force A of the vortex suction units 10 is sufficient to hold the article 50 against the belts 40 even in the presence of a gravitational force downward. In this conveyance system 100, the article 50 is both flipped and translated upwards by the design of the transfer path TP. Especially when the article 50 is relatively flat and flexible, such as paper, deflectors 88 may be provided between conveyors 80 that are separated and/or at angles relative to one another, such as horizontal and vertical conveyor 82, 84, to direct the article 50 onto the respective belts 40 or other conveyance surface. Further, a main controller 60 may be provided to control belt drives 44 and vary the conveyance speed of the conveyors 82a, 82b, 84 and/or to control the attraction force provided by the vortex suction units 10 either individually (separately) or in groups. For example, since the second horizontal conveyor 82b must adhere the article 50 against gravity, the vortex suction units 10 therein can be driven at a higher speed than those of the first horizontal conveyor 82a. Similarly, the attraction force A may be increased when a heavier article 50 enters the transfer path.

Referring to FIGS. 7-10, each vortex suction unit 10 may be provided with its own means of conveyance, such as, for example, its own pair of belts 40 having perforations 42 that are driven by traction rollers 46 connected to a belt drive 44. A cover 32 having ribs is provided on the housing 30 over the upper vortex generator 12 parallel to the belts 40 to provide a slight corrugation to flexible articles 50 in conveyance direction and to minimize friction as the article 50 moves across the cover 32. In an embodiment, the housing 30 surrounds the upper and lower vortex generators 12, 16, or at least the upper vortex generator 12. Additionally, each vortex suction unit 10 may also be provided with its own modular controller 62 which is functionally coupled with the motor 20 and/or the belt drive 44 to control the speed of the vortex suction unit 10 and belts 40 by varying power levels provided thereto. Further, each individual modular controller 62 may also be functionally coupled to a main controller 60 which, for example, is able to provide various signals to first and second vortex suction units 10a and 10b so as to move their respective motors 20 or belts 40 at different speeds depending on, for example, the desired attraction force, conveyance speed, positioning of the article 50 and predetermined transfer path TP.

Each vortex suction unit 10 may also be provided with its own means for rotation, such as a rotation motor 52 connected to a crown gear 54 disposed on a rear surface of the vortex suction unit 10. The rotation motor 52 is attached to a support 56 which is fixed at one end and at the other end is rotatably connected to the vortex suction unit 10 at the axis of rotation of the motor 20. The main controller 60, directly through control lines 64 or through a modular controller 62, provides power to the rotation motor 52 in order to rotate the crown gear 54 and position a vortex suction unit 10 at a particular alignment angle α. Further, the angular rotation of individual vortex suction units 10, which may be provided for both vertically and horizontally, can provide for numerous different, complex transfer paths TP in three-dimensions, and also allows for quick adjustments in transfer paths TP and for changes in alignment of articles 50 therein. For example, such rotatable vortex suction units 10 could be rotated before and or while holding an article 50 to distribute it to various conveyors 80 or belts 40 of other vortex suction units 10 disposed horizontally at angles to its own belts 40 and/or positioned vertically above or below.

Additionally, vortex suction units 10 provided with individual belts and/or rotation means may be used to align an article 50, for example, to an alignment edge 58 of a conveyor 80. The vortex suction units 10 are rotated to or disposed at an alignment angle α directed toward the alignment edge 58 to translate an article 50 from its position at an input traction rollers 46a and align it to the alignment edge 58 before exiting through the output traction rollers 46b. Alternatively or additionally, one row of vortex suction units 10 could be part of a first array 70a and a parallel row of vortex suction units 10 could be part of a second array 70b. In such a case, the controller 60 would be able to rotate the vortex suction units 10 of the first array 70a to the alignment angle α and/or drive their belts 40 at higher speeds than those of the vortex suction units 10 of the second array 70b to align the articles 50.

Figure 11:
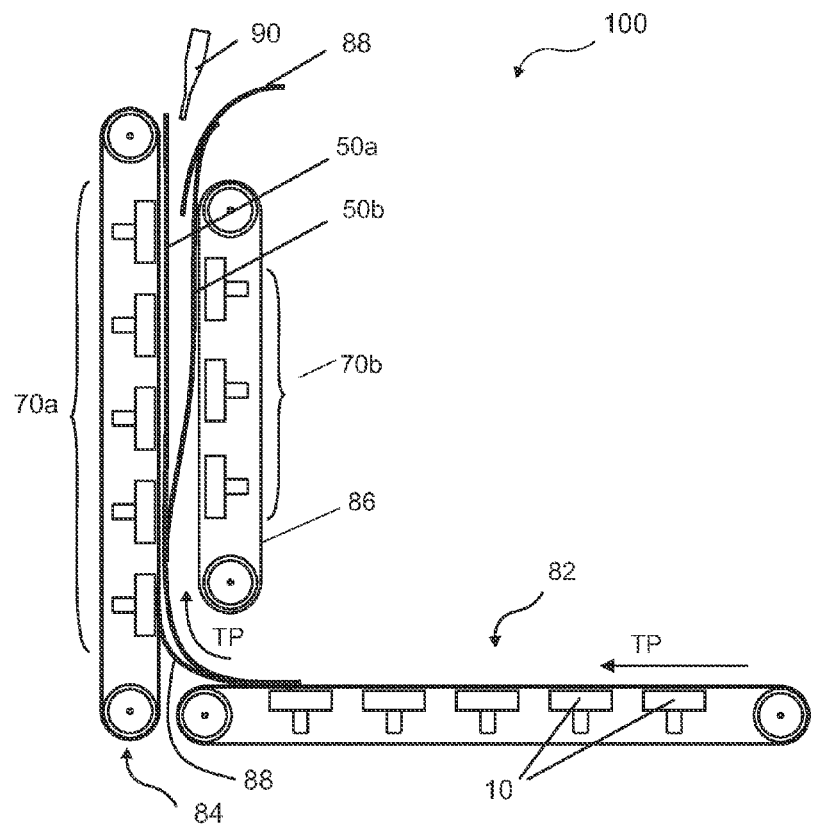
FIG. 11 is a schematic view of a conveyance system illustrative of use of the vortex suction units for double-pick handling.
Figure 12:
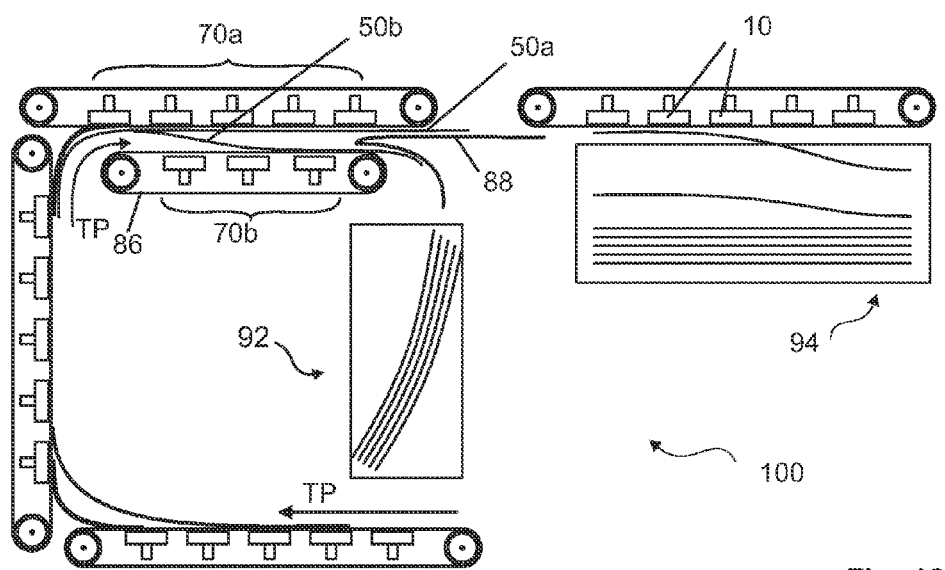
FIG. 12 is a schematic view of a conveyance system having sorting containers for the handling of a double-pick.

Referring to FIGS. 11 and 12, examples of conveyance systems 100 using vortex suction units 10 to handle double-picks, or multiple overlapping articles in the transfer path, are shown. First and second arrays 70a, 70b are arranged in parallel and facing one another. Referring to FIG. 11, as overlapping first and second articles 50a, 50b travel upwards along the transfer path TP on the vertical conveyor 84, the second article 50b will start to peel away from the first article 50a. An air knife 90 may provide a tangential air stream to facilitate the separation of the first and second articles 50a, 50b. The vortex suction units 10 of the first and second arrays 70a, 70b may be provided an increasing or decreasing attraction force A in the direction of the transfer path P. For example, the vortex suction units 10 at the lower end of the first array 70a may have a smaller attraction force A to ensure that an overlapping second article 50b will start to separate from the first article 50a. Additionally, as the second article 50b nears the vortex suction units 10 of the second array 70b, the air flow will become hindered, causing current to decrease and rpm to increase, at which point additional power may be provided to one or more of the vortex suction units of the second array. The conveyance system 100 of FIG. 12 is similar to that of FIG. 11, except that gravitational force aids in the separation of the second article 50b and that a stacking container 94 and a double-pick container 92 are provided for sorting first and second articles 50a, 50b, respectively. Further, the vortex suction units 10 above the stacking container may be sequentially slowed and/or disengaged so as to provide a gradual release of the article 50.

Figure 13:
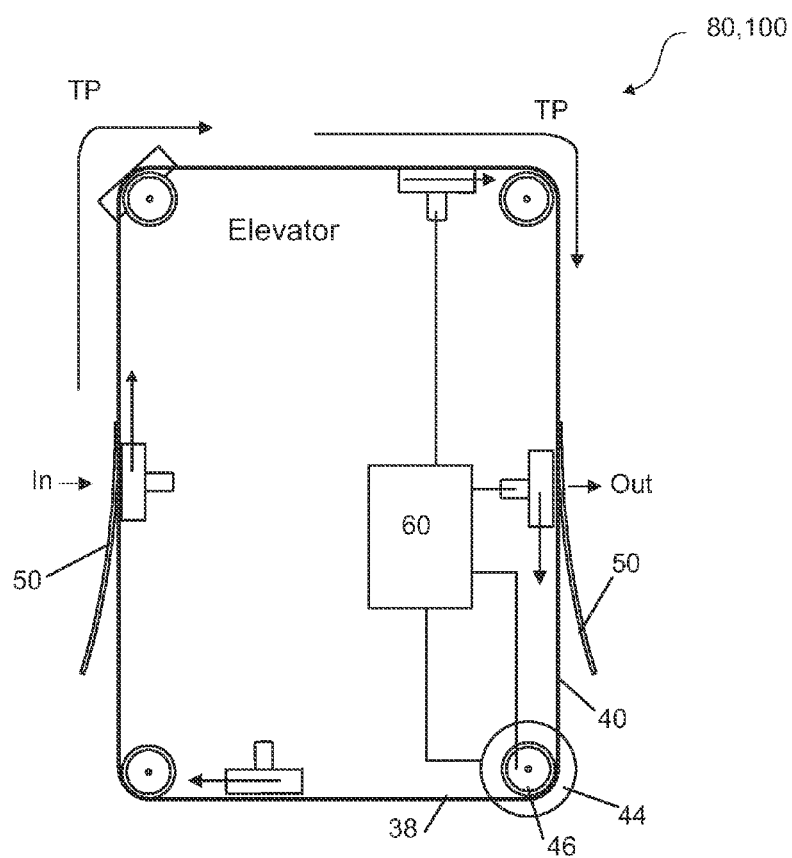
FIG. 13 is a schematic view of a conveyance system having guides for moving the vortex suction units along the transfer path.

Referring to FIG. 13, a conveyor 80 includes vortex suction units 10 which adhere to the articles 50 and move them along the transfer path TP. The vortex suction units 10 are mechanically and/or electrically connected to a guide 38 which travels in the direction of the transfer path TP. The guide 38 may be belts 40 or other conveyance means for moving the vortex suction units 10 in the direction of the transfer path TP. For example, a belt drive 44 can be used to drive one or more traction rollers 46 moving one or more belts 40 to which the vortex suction units 10 are attached. Additionally, the traction rollers 46 and the inside surfaces of the belts 40 may each be formed from a conductive material and electrically connected to the vortex suction units 10 to rout power thereto from a controller 60 or power source. The controller 60 may also be used to drive the belt drive 44 at various speeds and/or to adjust the power level at individual vortex suction units 10. While the conveyor 80 shown in FIG. 13 is an elevator conveyor which flips an article 50 from input I to output O, movable vortex suction units 10 traveling with or along a guide 38 in the direction of the transfer path TP may be provided in any type of conveyance system 100 alone or in combination with stationary vortex suction units 10.

Figure 14:
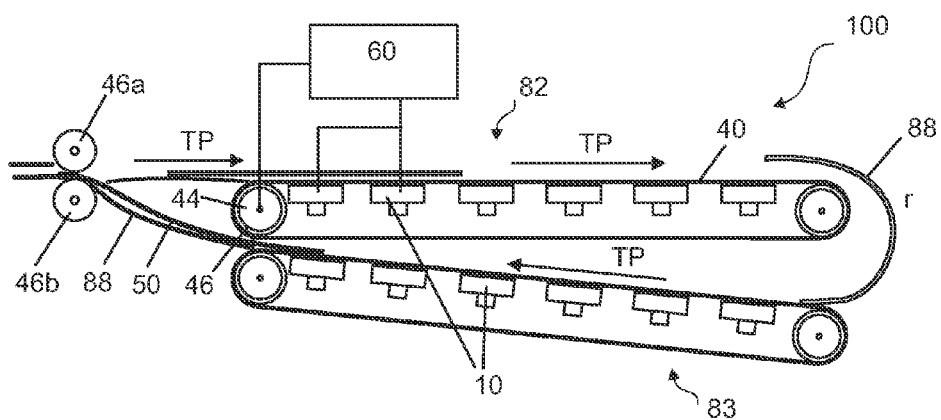
FIG. 14 is a schematic view of a flipping portion of a conveyance system.

Referring to FIG. 14, a conveyance system 100 which is also effective for flipping an article 50 provides the article 50 through a deflector 88 and input roller 46a to a horizontal conveyor 82 having vortex suction units 10. The article is then directed to an inclined conveyor 83 after being flipped by a deflector 88 having a radius of curvature r. The inclined conveyor 83 then carries the flipped article out through output roller 46b. A controller 60 may be provided to control the respective belt speeds of conveyors 82, 83 and the speed of each of their respective vortex suction units 10.

Figure 23:
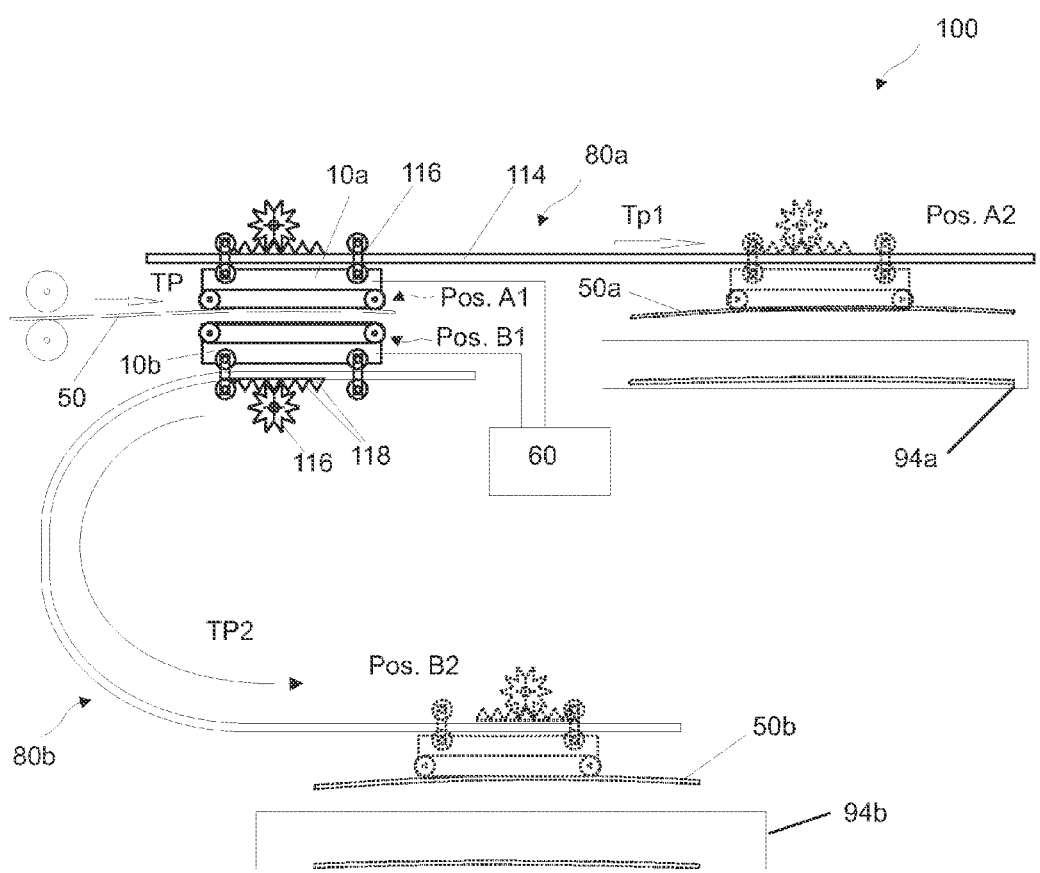
FIG. 23 is a schematic view of a conveyance system having two mechanical-guide conveyors and vortex suction units in accordance with the present invention.

Referring to FIG. 23, a conveyance system 100 having first and second conveying devices 80a, 80b with first and second vortex suction units 10a, 10b, is shown. As an article 50 moves along the transfer path TP between the first and second vortex suction units 10a, 10b, the main controller 60 selectively engages a respective one of the first and second suction units 10a, 10b to adhere the article 50 thereto. In the embodiment shown, the first conveying device 80a is a mechanical-guide conveyor which moves the first vortex suction unit 10a along a first secondary path TP1 extending from Position A1 in the transfer path TP to Position A2 at a first stacking container 94a. The second conveying device 80b is likewise a mechanical-guide conveyor which moves the second vortex suction unit 10b along a second secondary path TP2 extending from Position B1 in the transfer path TP to Position B2 at a second stacking container 94b. Mechanical-guide conveyors may use rollers 112 movable along rails 114 and/or drive gears 116 meshing with teeth 118. Further, the rollers 112 or the drive gears 116 connected with the vortex suction units 10 may also be coupled with the belt drives 44 thereof, or could be directly connected to the controller 60, to control speed and direction. Likewise, the first and second conveying devices 80a, 80b may utilize belts 40 respectively attached to the first and second vortex suction units 10a, 10b as in FIG. 13, which are bidirectional.

For example, where the article 50 is printed paper, it is adhered to either the first vortex suction unit 10a or the second vortex suction unit 10b depending on which side of the paper contains ink. When a first article 50a has printing on a first side, the controller 60 switches on or speeds up the first vortex suction unit 10a which then travels along the first secondary path TP1 to the first stacking container 94a, into which the first article 50a is dropped once the ink has dried. Similarly, when a second article 50b is printed on the opposite side, the controller 60 switches on or speeds up the second vortex suction unit 10b which then travels along the second secondary path TP2 to the second stacking container 94b, into which the second article 50b is dropped once the ink has dried.

Figure 15:
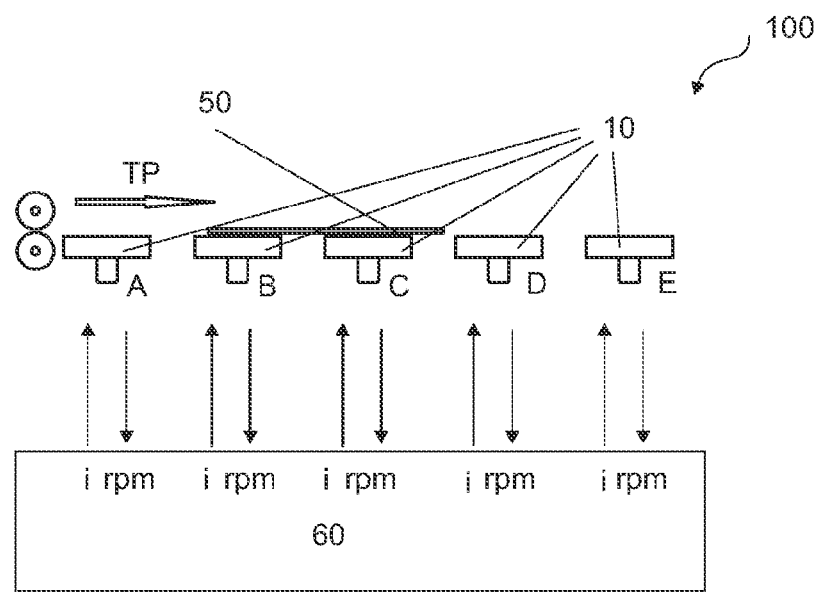
FIG. 15 is a schematic view illustrating the individual control of vortex suction units as an article is conveyed along the transfer path.
Figure 16:
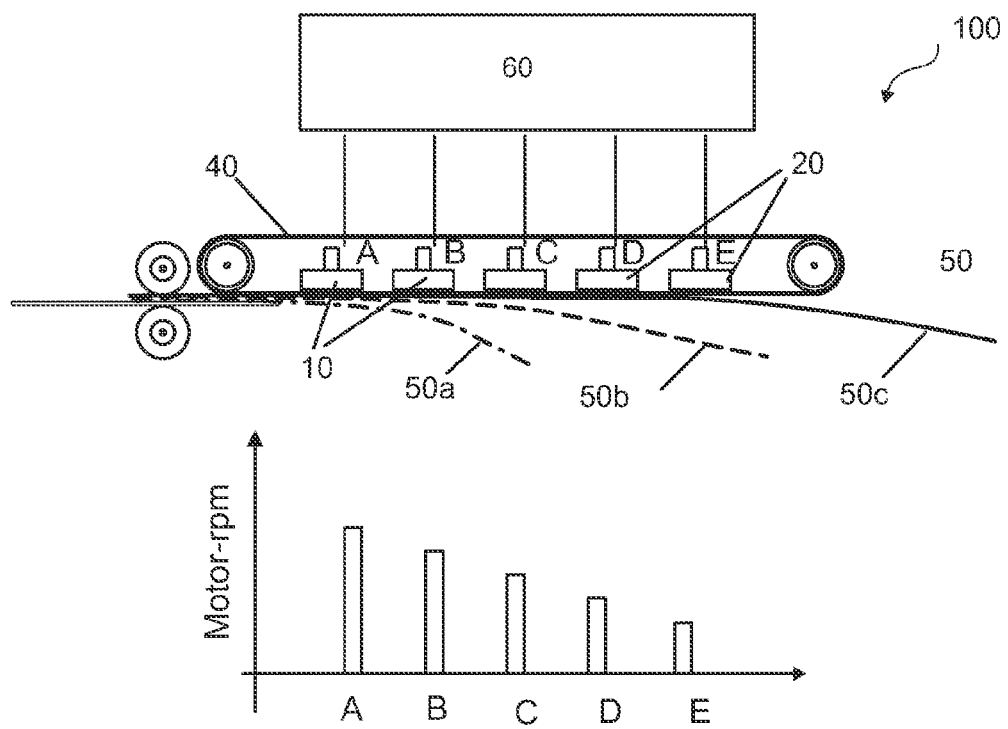
FIG. 16 is a schematic view illustrating the individual control of vortex suction units for conveying and sorting the article.
Figure 17:
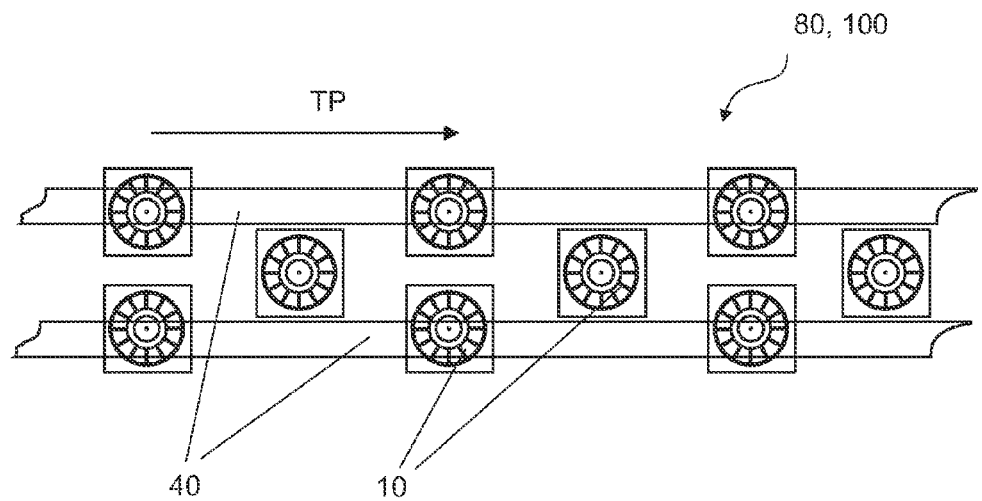
FIG. 17 is a sectional view of a staggered arrangement of vortex suction units in a conveyance system.

FIGS. 15 and 16 are schematic representations of different control schemes which may be provided to individual vortex suction units 10 of a conveyance system 100 through a main controller 60. The controller 60 may control individual vortex suction units 10 separately or in groups. When an article 50 is positioned in the low pressure region LP of a vortex suction unit 10, the air flow is hindered causing the current (i) to decrease and the speed (rpm) to increase compared to idle conditions. Thus, the current level and/or speed may be used as an indicator that a substrate is present adjacent a vortex suction unit 10, in other words, that a low pressure condition exists. Since the vortex suction unit 10-A is not covered by an article 50 as indicated to the controller 60 by a relatively high current and low speed, it may be switched off. Vortex suction units 10-B and 10-C are actively maintained in operation by the controller 60 since the article 50 is hindering air flow and causing the controller 60 to recognize a relatively low current and high speed. Further, the controller 60 recognizes that the subsequently arranged vortex suction unit 10-D will need to be switched on as it is next in the sequence. Once the article 50 is covering the vortex suction unit 10-D, vortex suction unit 10-B can be switched off and so on. The timing of such provident triggering of sequentially arranged vortex suction units 10-A through E by the controller 60 may be determined in accordance with a predetermined conveyance speed, the speed at which the controller 60 drives belts 40 and/or by relative changes in current or speed as the article 50 moves past individual vortex suction units 10. Because vortex suction units 10 are relatively small and lightweight, they may be shut off and activated relatively quickly. Thus, a consistent adherence may be applied efficiently since only vortex suction units 10 carrying an article 50 are active.

Alternatively or additionally, the controller 60 may provide different power levels to the motors 20 of the sequentially arranged vortex suction units 10-A through E so as to drive them at different speeds and thereby provide various magnitudes of an attraction force A. For example, the controller 60 could provide decreasing speeds to the sequentially arranged vortex suction units 10-A through E carrying an article 50 along a transfer path TP against the force of gravity. Heavier articles 50 will fall away sooner than lighter articles 50 because of the decreasing attraction force A. Thus, a sorting function may be obtained using deflectors 88 or sorting bins arranged in sequence to capture different articles 50a, 50b, 50c of various type, weight and/or size.

Figure 20:
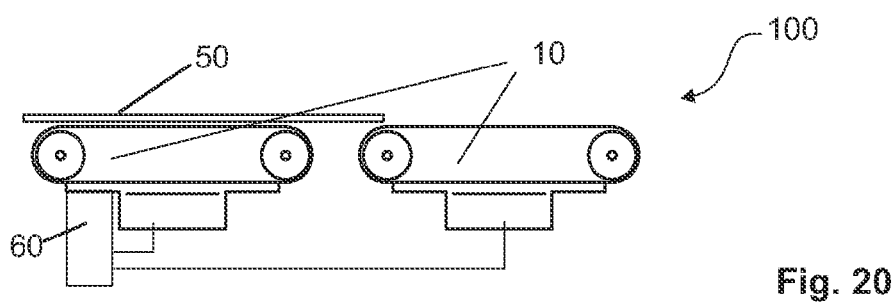
FIG. 20 is a schematic view of the controller of FIG. 19 integrated onto the first vortex suction unit.
Figure 21:
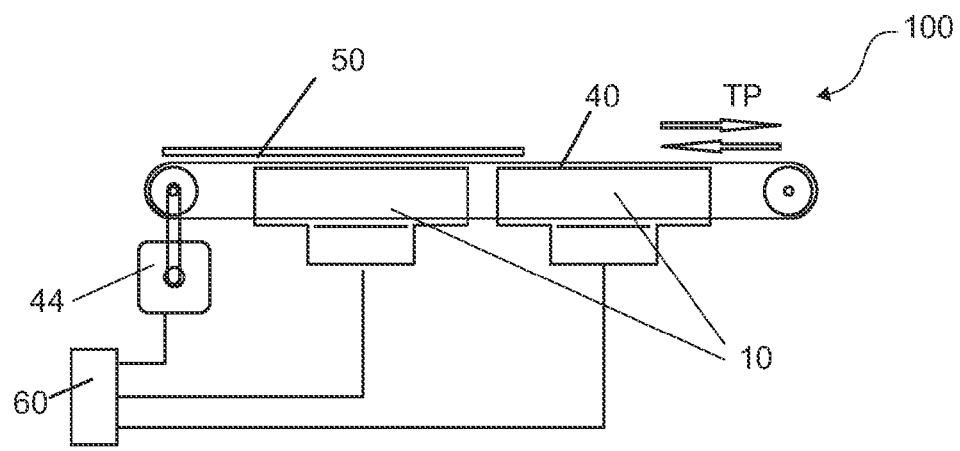
FIG. 21 is a schematic view of a controller for first and second vortex suction units having a shared belt and belt drive.
Figure 22:
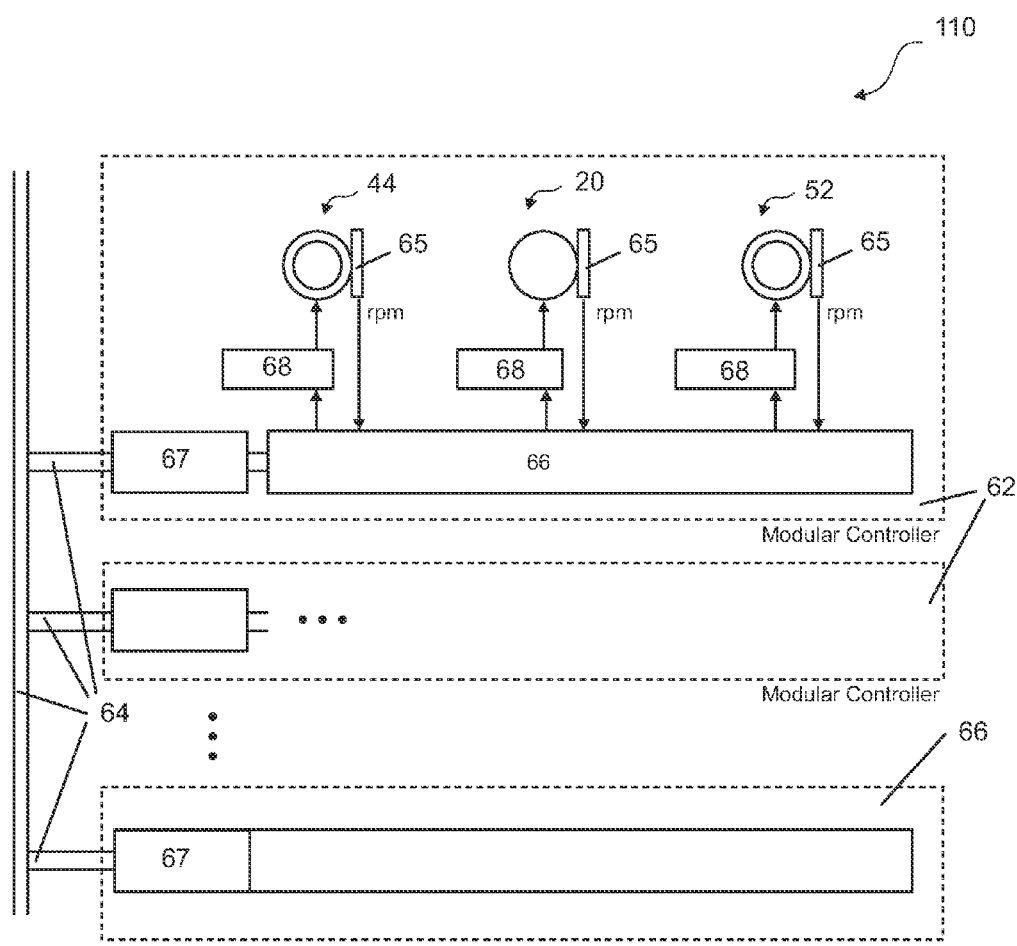
FIG. 22 is a schematic view of a main controller and modular controllers in accordance with an embodiment of the present invention.

Referring to FIGS. 19-22, the controller 60 for at least first and second vortex suction units 10a, 10b may be provided externally (FIGS. 19 and 21) or with one of the vortex suction units 10 (FIG. 20). The controller 60 provides power to the vortex suction units 10 either directly or through a modular controller 62 and senses current and speed. Additionally, the controller 60 may also power the belts 40, which may be common (FIG. 21) or provided for each vortex suction unit 10 (FIGS. 19 and 20), and control the direction thereof by switching the rotation of the belt drive 44.

A control system 110 includes a main controller 60, and optionally includes modular controllers 62 for individual vortex suction units 10. The main controller 60 and the modular controllers 62 may include one or more sub-controllers 66, which may be, for example microcontroller Model No. ATMEGA88P manufactured by ATMEL Corp. Further, the main controller 60 and the modular controllers 62 may include communication interfaces 67 connected through control lines 64 for data exchange. The communication interfaces 67 may be, for example, Control Area Network (CAN) controllers Model No. MCP2515 manufactured by Microchip Technology Inc. which communicate with the controllers 60, 62 through a standard Serial Peripheral Interface (SPI) and the control lines 64 may be a CAN bus system or a communication system using the RS-485 communication standard.

The main controller 60, which may be, for example, controller Model No. AT90CAN128 manufactured by ATMEL Corp., is provided to control the speed of belt drives 44, rotation motors 52 and/or the motors 20 of individual suction units 10 either directly or through modular controllers 62. The modular controllers 62 may include motor controllers 68 which may be, for example, control chip Model No. NJM 2673 manufactured by New Japan Radio Co., Ltd. for stepper motors or control chip Model No. EBL-H-50-03-05 manufactured by Portescap for brushless DC motors. In an embodiment, the belt drives 44 and the rotation motors 52 are stepper motors and the motors 20 are brushless DC motors. Further, sensors 65 may be provided for measuring the speed (rpm) of the belt drive 44, rotation motor 52 and/or motor 20, and for transmitting such data as an encoded signal to the main controller 60 either directly or through the modular controllers 62. Other configurations of the control system 110, however, are also possible. For example, where the modular controllers 62 are not provided the motor controllers 68 may be provided with the main controller 60 or on individual suction units 10.

The articles 50 may be flat, flexible articles, such as paper or plastic sheets. However, other types of articles, such as boxes or containers of various shape may be carried by conveyance systems 100 using vortex suction units 10 according to the present invention.

While the invention has been particularly shown and described with reference to preferred embodiments thereof, it will be understood by those skilled in the art that various changes in form and details may be made therein without departing from the spirit and scope of the invention. Accordingly, the invention is to be limited only by the scope of the claims and their equivalents.

What is claimed is:

1. A method of conveying an article along a transfer path comprising:
    disposing at least a first and a second vortex suction unit in sequence in a direction of the transfer path;
    supporting the article relative to at least one of the vortex suction units using a conveyor;
    determining a position of the article relative to the vortex suction units, using a controller, based on an air flow of at least one of the first and second vortex suction units being hindered by the position of the article relative to the vortex suction units;
    controlling the vortex suction units so as to convey the article using the conveyor.

2. The method according to claim 1, further comprising disposing third and fourth vortex suction units in sequence in the direction of the transfer path, wherein the first and third vortex suction units are controlled together as a first array and the second and fourth vortex suction units are controlled together as a second array.

3. The method according to claim 1, wherein the controlling includes sequentially operating each vortex suction unit along the transfer path based on the determined positions of the article as the article moves along the transfer path.

4. The method according to claim 1, wherein the controlling is performed so as to control at least one of a speed of the conveying, a direction of the conveying, and an attraction force of the article to the conveyor.

5. The method according to claim 1, wherein the determining the position of the article includes determining, by the controller, at least one of a speed and a current of at least one of the first and second vortex suction modules.

6. The method according to claim 1, wherein the controlling includes a provident triggering of sequentially arranged vortex suction units along the transfer path based on relative changes in at least one of a speed and a current of the sequentially arranged vortex suction units.

7. The method according to claim 1, further comprising aligning the article to an alignment edge using at least one of different belt speeds of the conveying devices and a rotation of at least one of the vortex suction units.

8. The method according to claim 1, wherein the determining the position of the article is performed without using an external sensor.

9. The method according to claim 1, wherein the determining the position of the article is performed by the controller measuring at least one of a speed and a current of the vortex suction modules.

10. The method according to claim 9, wherein the controlling is performed by the controller separately operating the vortex suction modules sequentially along the transfer path.

11. The method according to claim 1, further comprising operating the first and second vortex suction modules at different speeds.

12. The method according to claim 1, wherein the determining the position of the article further comprises using the controller to determine whether the air flow of a third vortex suction unit, disposed sequentially along the transfer path after the first and second vortex suction units, is also being hindered by the position of the article.

* * * * *